US012785293B2

(12) United States Patent
Obermayer et al.

(10) Patent No.: US 12,785,293 B2
(45) **Date of Patent: *Nov. 3, 2026**

(54) ANTENNA WITH DUAL POLARIZED RADIATORS

(71) Applicant: Telefonaktiebolaget LM Ericsson (publ), Stockholm (SE)

(72) Inventors: Maximilian Obermayer, Rosenheim (DE); Andreas Vollmer, Rosenheim (DE); Markus Mohr, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 115 days.

This patent is subject to a terminal disclaimer.

(21) Appl. No.: 18/720,927

(22) PCT Filed: Dec. 22, 2021

(86) PCT No.: PCT/EP2021/087434

§ 371 (c)(1),
(2) Date: Jun. 17, 2024

(87) PCT Pub. No.: WO2023/117096

PCT Pub. Date: Jun. 29, 2023

(65) Prior Publication Data

US 2025/0062545 A1 Feb. 20, 2025

(51) Int. Cl.
*H01Q 21/26* (2006.01)
*H01Q 1/24* (2006.01)

(52) U.S. Cl.
CPC ............. *H01Q 21/26* (2013.01); *H01Q 1/246* (2013.01)

(58) Field of Classification Search
CPC ............................... H01Q 21/26; H01Q 1/246
See application file for complete search history.

(56) References Cited

U.S. PATENT DOCUMENTS 4,287,518 A 9/1981 Ellis, Jr.
4,686,536 A * 8/1987 Allcock ................. H01Q 9/065 343/797

(Continued)

FOREIGN PATENT DOCUMENTS

CN 113889747 A 1/2022
CN 114122718 A 3/2022

(Continued)

OTHER PUBLICATIONS

Li, Ronglin, et al., "Equivalent-Circuit Analysis of a Broadband Printed Dipole With Adjusted Integrated Balun and an Array for Base Station Applications," IEEE Transactions on Antennas and Propagation, vol. 57, Issue 7, Jul. 2009, pp. 2180-2184.

(Continued)

*Primary Examiner* — Hai V Tran
(74) *Attorney, Agent, or Firm* — Withrow & Terranova, PLLC

(57) ABSTRACT

An antenna, in particular for a mobile communication cell site, has a radiator and a radiator feed being electrically coupled to the radiator. The radiator is a dual polarized dipole radiator, wherein each dipole is formed of two dipole arms and the dipoles are in a crossed arrangement relative to each other. The radiator feed comprises a feed line for each dipole, a balun for each dipole and a connection port for each dipole arm of the radiator, wherein the radiator feed extends within a single feed plane between the dipole arms, the feed plane intersecting the dipoles in the region of the crossing. Further, a mobile communication cell site is shown.

16 Claims, 4 Drawing Sheets

(56) References Cited

U.S. PATENT DOCUMENTS

| | | | | |
|---|---|---|---|---|
| 6,072,439 | A | 6/2000 | Ippolito et al. | |
| 6,400,332 | B1 | 6/2002 | Tsai et al. | |
| 7,053,852 | B2 | 5/2006 | Timofeev et al. | |
| 7,978,144 | B2 | 7/2011 | Tanabe et al. | |
| 9,306,262 | B2 * | 4/2016 | Puzella | H01Q 9/28 |
| 9,437,929 | B2 | 9/2016 | Isom et al. | |
| 11,158,956 | B2 * | 10/2021 | Le | H01Q 1/38 |
| 2003/0090430 | A1 * | 5/2003 | Waltho | H01Q 21/26 343/700 MS |
| 2011/0122039 | A1 | 5/2011 | Baba et al. | |
| 2012/0075155 | A1 | 3/2012 | Lindmark et al. | |
| 2012/0098725 | A1 | 4/2012 | Lytle et al. | |
| 2014/0111396 | A1 * | 4/2014 | Hyjazie | H01Q 21/26 343/893 |
| 2014/0240056 | A1 | 8/2014 | Isom et al. | |
| 2016/0372839 | A1 * | 12/2016 | Watson | H01Q 9/42 |
| 2018/0034165 | A1 * | 2/2018 | Aleksandrovich | H01Q 5/392 |
| 2019/0280377 | A1 | 9/2019 | Zhang et al. | |
| 2020/0006861 | A1 | 1/2020 | Kasani et al. | |
| 2021/0207683 | A1 | 7/2021 | Bell et al. | |
| 2021/0305718 | A1 | 9/2021 | Li et al. | |
| 2021/0305722 | A1 | 9/2021 | Zhang et al. | |
| 2021/0376481 | A1 | 12/2021 | Zhang et al. | |
| 2022/0077600 | A1 * | 3/2022 | Sundararajan | H01Q 5/42 |
| 2023/0017375 | A1 * | 1/2023 | Wu | H01Q 5/42 |

FOREIGN PATENT DOCUMENTS

| | | | |
|---|---|---|---|
| CN | 216055166 | U | 3/2022 |
| EP | 1772929 | A1 | 4/2007 |
| EP | 2672568 | A2 | 12/2013 |
| WO | 2018224666 | A1 | 12/2018 |
| WO | 2022022804 | A1 | 2/2022 |
| WO | 2023117097 | A1 | 6/2023 |

OTHER PUBLICATIONS

Marnat, et al., "On-Chip Implantable Antennas for Wireless Power and Data Transfer in a Glaucoma-Monitoring SoC," IEEE Antennas and Wireless Propagation Letters, vol. 11, Jan. 2012, pp. 1671-1674.

Yuan, et al., "Novel Miniaturized Broadband Quasi-Yagi Antennas Based on Modified Bowties Driver for Wireless Technology Applications," Progress in Electromagnetics Research M, vol. 63, Jan. 2018, pp. 151-161.

International Search Report and Written Opinion for International Patent Application No. PCT/EP2021/087435, mailed Jul. 28, 2022, 10 pages.

International Search Report and Written Opinion for International Patent Application No. PCT/EP2021/087434, mailed Jul. 28, 2022, 11 pages.

* cited by examiner

ANTENNA WITH DUAL POLARIZED RADIATORS

This application is a 35 U.S.C. § 371 national phase filing of International Application No. PCT/EP2021/087434, filed Dec. 22, 2021, the disclosure of which is incorporated herein by reference in its entirety.

TECHNICAL FIELD

The invention relates to the field of antennas, in particular having dual polarized dipole radiators, comprising a feeding structure as well as a corresponding cell site having an antenna.

BACKGROUND

Antennas are typically composed of multiple radiators so as to enable radio frequency cellular communication with an improved transmission range and/or with distinct frequency bands. Such radiators may be formed as dual polarized dipole radiators, which are formed of two dipole arms, each dipole arm requiring a respective feed structure.

These feed structures may be realized on a PCB. In order to provide a respective feed line for both dipole arms, the feed structure is commonly formed of two PCB parts that are positioned such that the respective feed lines are in an orthogonal arrangement to each other. Further, a balun for the radiator has to be provided, necessitating further space. Examples of such feed structures are described, e.g., in U.S. Pat. Nos. 6,072,439, 7,053,852, EP 2 672 568 A2, EP 1 772 929 A1, and WO 2018/224666 A1.

SUMMARY

The size of the feeding network, including baluns, and of the physical feeding structure limit the integration of radiator components in the antenna.

It is thus the object of the invention to provide a feeding structure that provides many functions of the feeding network and reduces the amount of space necessary for the physical feeding structure.

For this purpose, an antenna, in particular for a mobile communication cell site, is provided. The antenna comprises at least one radiator and a radiator feed being electrically coupled to the at least one radiator, the radiator being a dual polarized dipole radiator, wherein each dipole is formed of two dipole arms and the dipoles are in a crossed arrangement relative to each other, wherein the radiator feed comprises a feed line for each dipole, a balun for each dipole and a connection port for each dipole arm of the radiator, and wherein the radiator feed extends within a single feed plane between the dipole arms, the feed plane intersecting the dipoles in the region of the crossing.

By arranging the feed plane in the region between the dipole arms, the space necessary for the physical feeding structure is reduced. At the same time, by providing a balun on the radiator feed, the radiation symmetry of the radiator is improved and the construction of the radiator simplified.

The radiator feeds extend in particular fully within the single feed plane.

In an embodiment, adjacent dipole arms are spaced apart by a gap, wherein the gap defines the feed plane.

In particular, the gap extends in the center of radiator and from the center outwards. The dipole arms may be physically connected at the outer end of the gap.

In order to minimize adverse effects of the radiator feed on the signal, the feed plane may be 45° rotated with respect to the linear polarization plane of one of the dipoles and 135° rotated with respect to the linear polarization plane of the other one of the dipoles.

In an aspect, each one of the dipole arms is connected to one of the connection ports, in particular wherein the dipole arms of the same dipole are connected to connection ports which are connected to the same feed line. This way, the dipoles can be fed reliably.

For improved radiation characteristics, the dipole arms of each dipole may extend in a dipole plane, in particular the dipole arms of both dipoles extend in the same dipole plane, wherein the radiator feed extends perpendicularly to said dipole plane.

The dipole plane extends in particular parallel to the reflector plane.

In an embodiment, the radiator comprises a substrate, in particular a PCB, and metallizations applied to the substrate forming the dipole arms, and/or wherein the radiator is made of a metal structure, in particular a metal sheet, forming the dipole arms, allowing cost efficient manufacture of the radiator. In particular, the use of a metal sheet reduces manufacturing costs.

The substrate may extend perpendicularly to the feed plane and/or parallel to the dipole plane. The metal sheet may be a punched metal sheet.

In order to avoid crosstalk between the two polarizations of the radiator, and as the feed lines extend vertically from a respective input port of the radiator feed parallel to one another, there may be a grounded metallization section of the radiator feed laterally between the feed lines.

For example, no electrical connection between the ground and the radiator is provided.

To simplify the construction further, the connection ports for the dipole arms of the same dipole may lie on different sides of the radiator feed, in particular wherein the connection ports for dipole arms of different dipoles lie directly opposite to one another on the different sides.

For example, different sides are different surfaces of the substrate. Each dipole may be galvanically or capacitively connected to a different one of the connection ports, e.g. by soldering.

In an embodiment, the radiator feed comprises a T-section and a pair of branches for each dipole, wherein, for each dipole, the feed line extends from an input port to the T-section and each branch of the pair of branches extends from the T-section to a different one of the connection ports, in particular wherein one of the branches of each pair is a delay branch comprising a delay line. With this design, the radiator feed provides several functions of the feeding network, thus using the available space efficiently.

The T-section may be a splitter or a combiner and/or each pair of branches may form a balun.

To provide a balanced signal, the difference in length of the branches of the same pair may be $\lambda/2$ or $\lambda/4$ of the wavelength of the center frequency of the design frequency range of the radiator.

In an embodiment, the radiator feed comprises a substrate having a first surface, a second surface and plurality of signal conductors applied to the surfaces, wherein the signal conductors form the feed line, the T-section, the branches and/or the connection ports, in particular wherein one of the branches of each pair extends partly on the first surface and partly on the second surface. This allows a very cost efficient manufacture of a mechanically stable radiator feed.

For example, the feed line, the T-section, one of the branches and/or the input ports are located on first surface.

One of the pair of branches may extend only on one surface, in particular on the first surface.

In an aspect, a crossing section of one of the branches of one of the pairs of branches crosses a crossing section of one of the branches of the other pair of branches, in particular the crossing sections of the different branches extend on different surfaces of the substrate. This way, the connection port may be arranged flexibly.

In particular, the delay branches cross one another.

For example, the crossing is located laterally between the direct branches.

In order to provide a crossing without crosstalk, the substrate may comprise vias, wherein the branches with the crossing sections may comprise intermediate sections before and after the crossing section, the intermediate sections of both branches may be located on the same surface of the substrate and one of the crossing sections may be provided on the other surface and may be connected to the intermediate sections by the vias.

For example, the intermediate sections extend on the second surface.

For a high quality signal transfer, at least one grounding layer may be applied to the second surface of the substrate at least directly opposite of at least one of the feed lines, one of the branches and/or delay lines, wherein the grounding layer and the respective signal conductor may form a microstrip transmission line.

In particular, only one grounding layer may be used for the feed lines of both dipoles.

In an embodiment, the substrate of the radiator feed forms a support structure for the radiator and/or wherein the radiator feed is formed as a single piece, providing a mechanically reliable but cost efficient way of supporting the radiator.

For above mentioned purpose, further a cell site is provided comprising an antenna as described above.

The features and advantages mentioned with respect to the antenna also apply to the cell site and vice versa.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
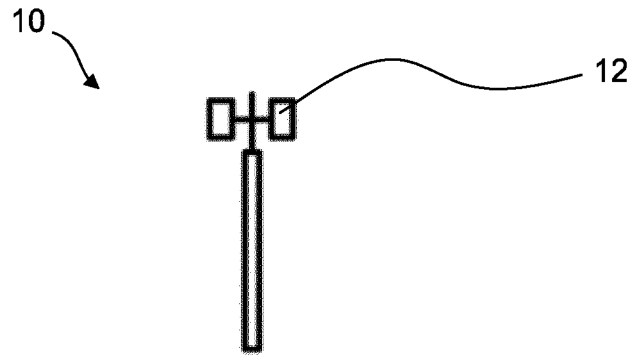
FIG. 1: shows a mobile communication cell site according to the invention with an antenna according to the invention.

FIG. 1 shows a mobile communication cell site 10 having at least one antenna 12.

The antenna 12 comprises a plurality of radiators 14 arranged in an area above a reflector.

Figure 2:
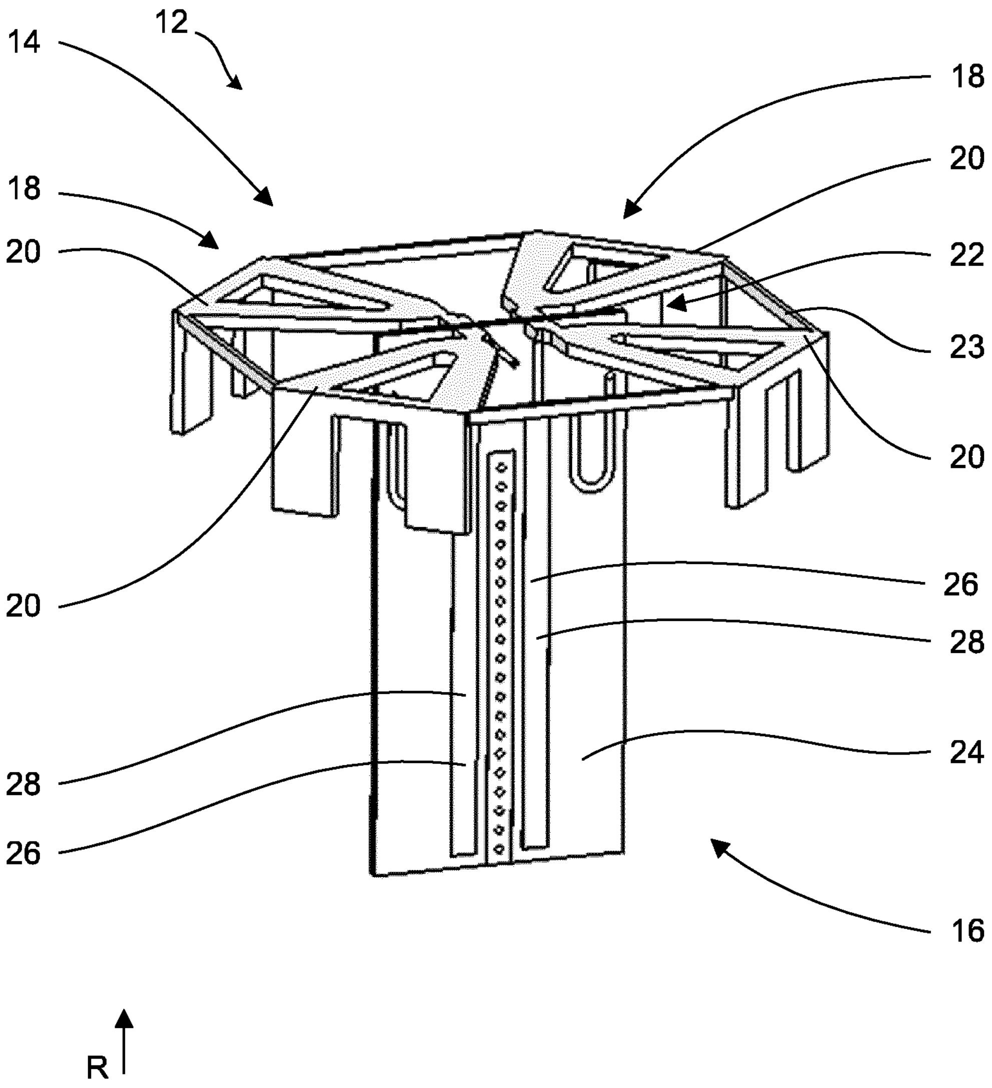
FIGS. 2, 3: show part of the antenna according to FIG. 1 in a perspective view and a top view, respectively.
Figure 3:
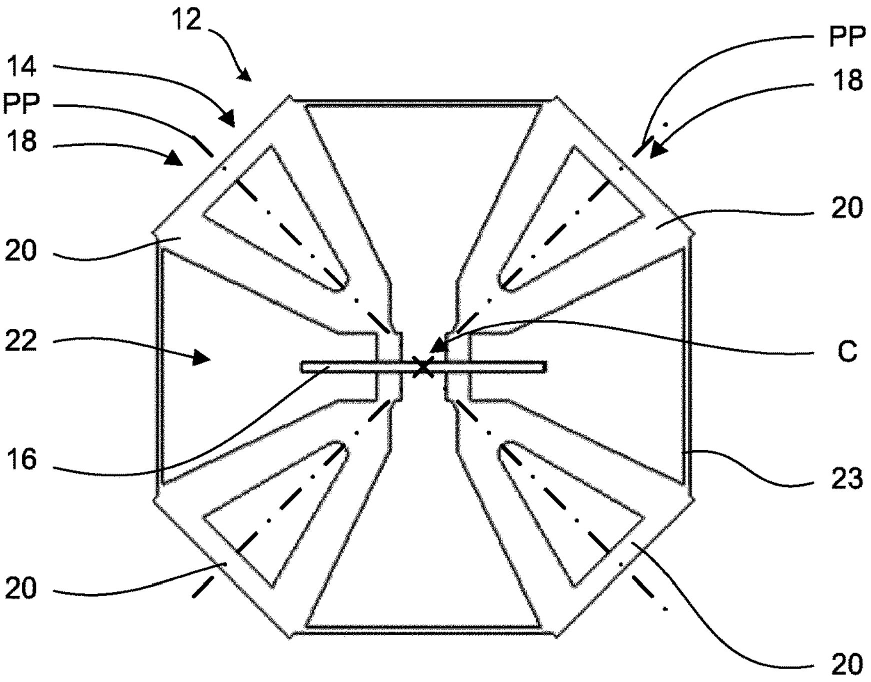

FIGS. 2 and 3 show a single radiator 14 with a respective radiator feed 16 of the antenna 12.

The radiator feed 16 supports the radiator 14 mechanically and provides the necessary electrical connections to feed signals to the radiator 14 and receive signals from the radiator 14.

The radiator 14 comprises two dipoles 18 each having two dipole arms 20.

The dipole arms 20 and the dipoles 18 all extend within a single plane, called dipole plane within this disclosure.

The dipole arms 20 are arranged symmetrically around a center C of the radiator 14 as seen in FIG. 3. The center is in particular the centroid of the radiator 14 in a top view.

The polarization planes PP of the two dipoles 18 are orthogonal to one another so that the radiator 14 is a dual polarized radiator.

Between adjacent dipole arms 20, a gap 22 is provided. For example, the gap 22 extends from the center C fully outwards so that adjacent dipole arms 20 are fully separate from one another. It is also conceivable, as shown in FIG. 3, that the gap 22 extends only partly outwards until a connection 23 between adjacent dipole arms 20. The connection lies in particular at the periphery of the radiator 14.

Even though no dipole arms 20 are present in the center C of the radiator, the resulting dipoles 18 cross one another in the region of the center, thus are in a crossed arrangement relative to each other.

This leads to a region of the crossing corresponding to a region around the center C of the radiator 14.

Further, the dipole arms 20 that are diagonally opposite to one another with respect to the center C of the radiator 14 form one of the dipoles 18 together.

For example, the radiator 14 is made of a single piece.

In the shown embodiment, the radiator 14 is made of a metal structure, here a metal sheet that has been punched. The dipole arms 20 are therefore made out of metal.

The radiator feed 16 comprises only one substrate 24 with a first surface S1 and a second surface S2 as well as a plurality of signal conductors 26 applied to the substrate 24 forming the electrical connections to and from the radiator 14.

For example, the radiator feed 16 is made out of a single piece. The substrate is, for example, a PCB.

The substrate 24 also forms a mechanical support structure for the radiator 14.

The surfaces S1, S2 of the substrate 24 correspond to the different sides of the radiator feed 16.

The substrate 24 and thus the whole radiator feed 16 extend fully in a single plane, called feed plane within this disclosure. The feed plane is perpendicular to the dipole plane.

The feed plane extends in one of the gaps 22 between the dipole arms 20, i.e. one of the gaps 22 defines the feed plane, and intersects the dipole plane and thus the dipoles 18 at least in the region of the crossing of the dipoles 18.

The feed plane is 45° rotated with respect to the linear polarization plane of one of the dipoles and 135° rotated with respect to the linear polarization plane of the other one of the dipoles 18.

The substrate 24 and thus the radiator feed 16 extends between the dipole arms 20 in the gap 22, also extending across the center C of the radiator 14.

The dipole arms 20 are connected to the substrate 24 at the top end of the substrate 24.

The dipole arms 20 of the same dipole 18 are connected to the substrate 24 on opposite surfaces of the substrate 24.

The terms "top", "bottom", "up", "down", "above", "below", "laterally" or the like are used with reference to the radiation direction R of the antenna 12 and the radiator 14 in the drawings for ease of understanding, but not to restrict the orientation of the antenna 12 when mounted in the cell site 10.

The radiation direction R is substantially perpendicular to the dipole plane.

Figure 4:
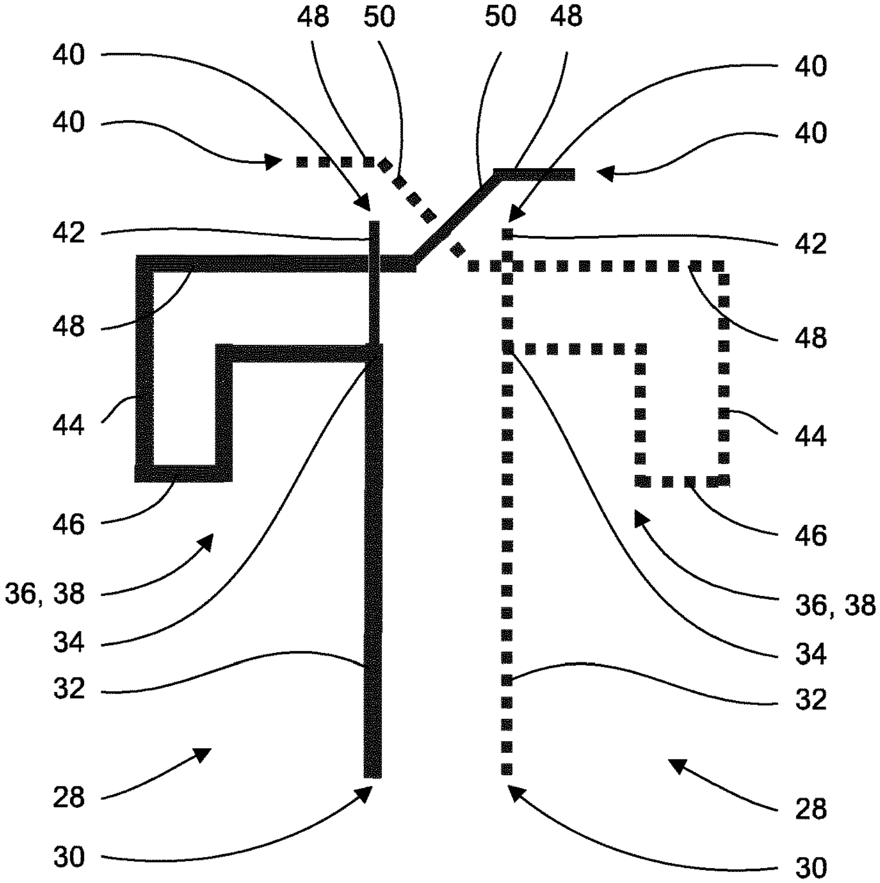
FIG. 4: shows schematically the electrical connections of the radiator feed of the antenna according to FIG. 2, FIGS. 5, 6: show a front view and a back view, respectively, of the radiator feed of the antenna according to FIG. 2, and FIG. 7: shows a second embodiment of an antenna according to the invention.

FIG. 4 shows schematically the electrical connections provided by the radiator feed 16, e.g. by the signal conductors 26.

For each of the dipoles 18, one feeding network 28 is provided by the signal conductors 26 on the substrate 24, wherein the feeding networks 28 are electrically separate from one another. For the sake of clarity only, one of the feeding networks 28 is depicted in dotted lines, the other one in solid lines.

In the following, only one feeding network 28 is described for the ease of reference but also representing the other one.

The feeding network 28 comprises an input port 30, a feed line 32, a T-section 34, a pair of branches 36 forming a balun 38, as well as two connection ports 40.

The pair of branches 36 comprises a direct branch 42 and a delay branch 44, comprising a delay line 46.

Further, one of the branches 42, 44 comprises two intermediate sections 48 and a crossing section 50 arranged between the intermediate sections 48. In the shown embodiment, the delay branch 44 comprises the intermediate sections 48 and the crossing section 50.

The input port 30 is used for receiving signals from and sending signals to a transceiver, amplifier or any other component of a base station.

Starting from the input port 30, the feed line 32 extends upwards to the T-section 34. The T-section 34 is a splitter and/or combiner for signals to and from the radiator 14.

From the T-section 34 the direct branch 42 extends to one of the connecting ports 40.

In the delay branch 44, the delay line 46 extends from the T-section 34. The delay branch 44 continues further with one of the intermediate sections 48, then the crossing section 50 and the other intermediate section 48 until reaching the other one of the connection ports 40.

The length of the direct branch 42, i.e. its length between the T-section 34 and the respective connection port 40 is different from the length of the delay branch 44, i.e. the length of the delay branch 44 from the T-section 34 to the respective connection port 40. The difference in the lengths of the branches 42, 44 is one half or one quarter of the wavelength of the center frequency of the design frequency range of the radiator 14. Thus, the pair of branches 36 functions as a balun 38.

The two feeding networks 28 are arranged one besides the other in a way that the feeding lines 32 extend parallel but spaced apart laterally.

The crossing sections 50 of the different feeding networks 28 cross one another, in the shown embodiment in a region laterally defined by the feed line 32 of the feeding networks 28.

Figure 5:
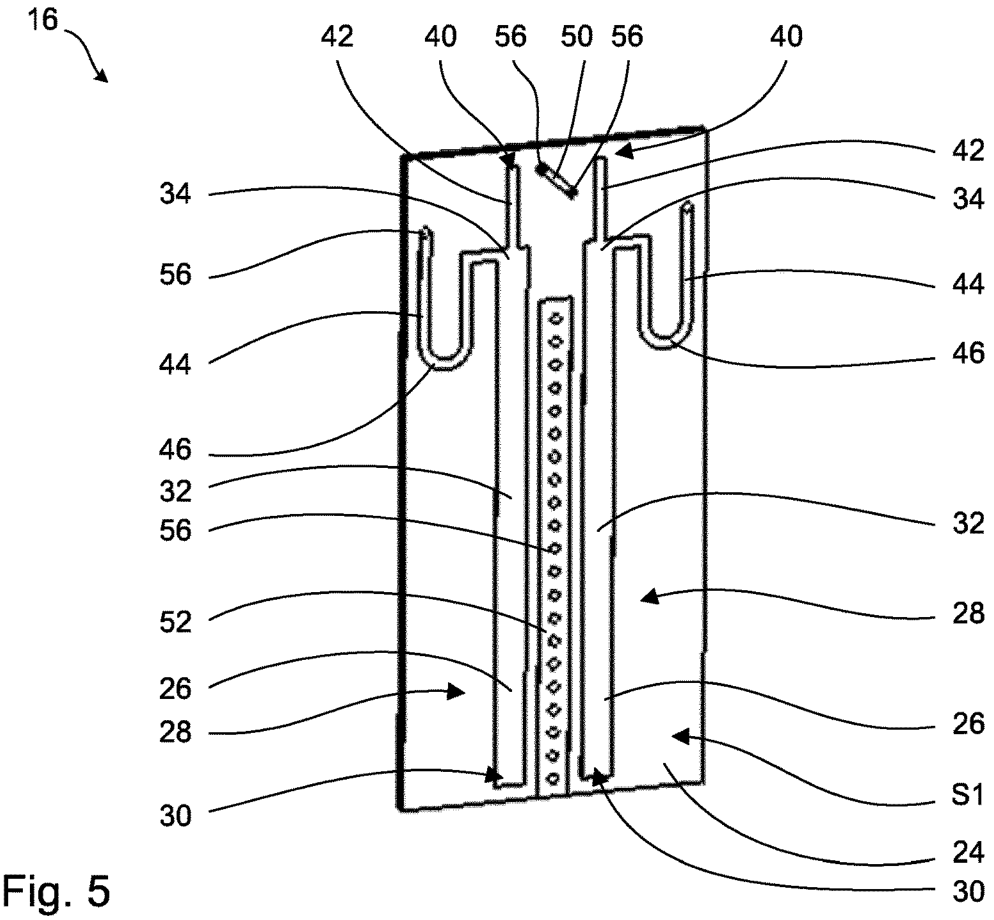
Figure 6:
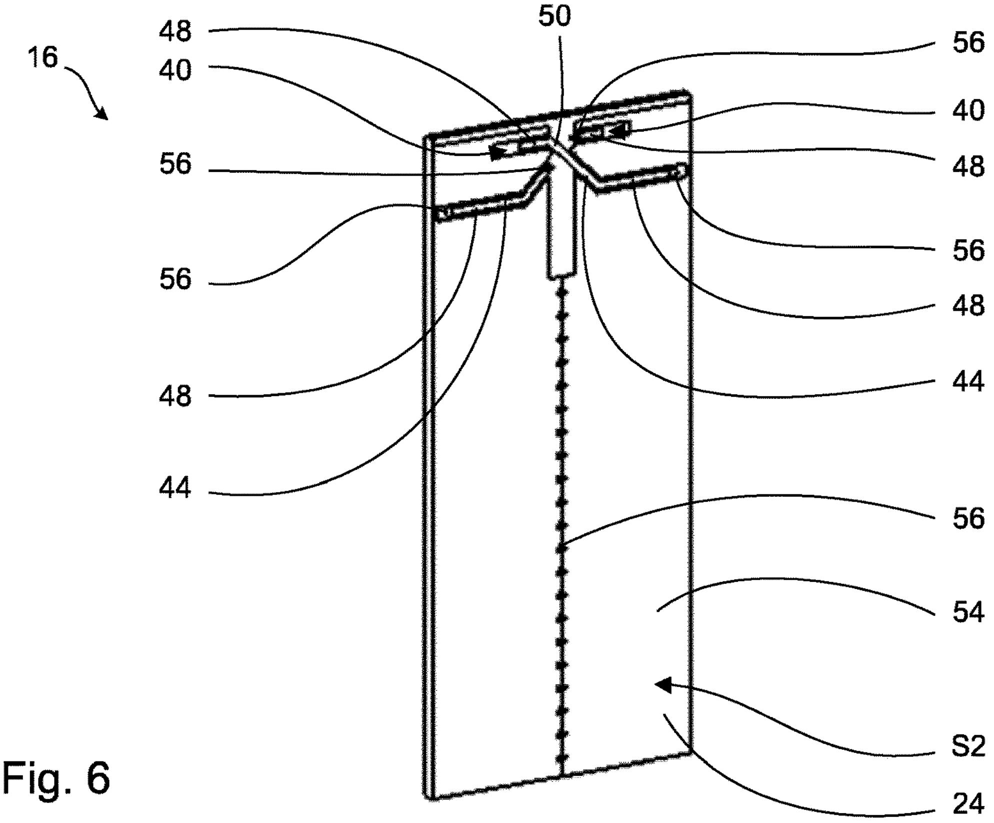

FIGS. 5 and 6 show the first surface S1 and the second surface S2, respectively, of the substrate 24 with the applied signal conductors 26.

The signal conductors 26 are applied to both the first side, i.e. the first surface S1 of the substrate 24, and the second side, i.e. the second surface S2.

The signal conductors 26 form two feeding networks 28 as schematically shown in FIG. 4.

The feed lines 32, the T-sections 34, the direct branch 42, parts of the delay branch 44, in particular the delay line 46, and two of the four connection ports 40, one of each feeding network 28, are located on the first side S1 of the substrate 24.

The input ports 30 are located at the lower end of the substrate 24 and the connection ports 40 are located at the upper end of the substrate 24.

Further, on the first surface S1, a grounded metallization section 52 is located between the feed lines 32 of the two feeding networks 28. The grounded metallization section 52 may extend from the bottom end of the substrate 24 upwards.

On the second surface S2 of the substrate 24, the remaining parts of the delay branch 44, in particular the intermediate sections 48, as well as the two remaining connection ports 40 (again one of each feeding network 28) are located.

Further, on the second surface S2, a grounding layer 54 is applied which covers the majority of the second surface S2. In particular, the grounding layer 54 extends from the bottom upwards and over the full width of the substrate 24 to the T-sections 34.

For example, the grounding layer 54 is at least directly opposite to the feed lines 32, the direct branch 42, the T-sections 34 and the delay line 46 of the delay branch 44. This way, the grounding layer 54 and the respective signal conductors 26 on the first side S1 form a microstrip transmission line.

The grounding layer 54 is connected to the grounded metallization section 52 by vias 56 of the substrate 24.

Further, in the shown embodiment, a single grounding layer 54 is provided. It is also conceivable, that a grounding layer 54 for each of the feeding networks 28 is provided.

The connection ports 40 are located such that for one connection port 40 on the first side S1, another one of the connection ports 40 on the second side S2 is directly opposite. In particular, the connection ports 40 which are directly opposite to one another are connection ports 40 of different feeding networks 28.

The connection ports 40 on different surfaces S1, S2 of the substrate 24 that are located diagonally opposite to one another with respect to the center C are the two connection ports 40 of the same feeding network 28.

To each one of the connection ports 40, a different one of the dipole arms 20 is connected galvanically. A capacitive connection between the connection ports 40 and the respective dipole arm 20 is also conceivable.

Due to the arrangement of the connection ports 40 as explained above, the dipole arms 20 of the same dipole 18 are connected to the same feeding network 28 and thus the same feed line 32 and input port 30.

For example, the dipole arms 20 are not connected to the ground, i.e. no connection between the grounded metallization section 52 or the grounding layer 54 is present.

Except for the crossing sections 50, the feeding networks 28 are mirrored to one another, also with respect to the corresponding signal conductors 26 located on the same surface S1, S2 of the substrate 24.

The delay branch 44 extends on both surfaces S1, S2.

The delay line 46 extends from the T-section 34 to a via 56 on the first surface S1. By the via 56, the delay branch 44 is led to the second surface S2, i.e. the delay line 46 on the first surface S1 is galvanically connected to the first intermediate section 48 on the second surface S2.

The first intermediate section 48 extends from the via 56 until the crossing section 50 is reached. For one of the feeding networks 28, the crossing section 50 continues on the second surface S2, merges with the second intermediate section 48 until reaching the connection port 40 on the second surface S2.

In the other one of the feeding networks 28, however, the crossing section 50 is located at the first surface S1 again.

In this feeding network 28, the intermediate section 48 on the second surface S2 is led to the first surface S1 by a via 56 to contact the crossing section 50.

At the end of the crossing section 50 another via 56 is present connecting the crossing section 50 to the second intermediate section 48 on the second surface S2.

The second intermediate section 48 then leads to the connection port 40 on the second surface S2.

The crossing sections 50 of the different feeding networks 28 cross one another but are located on different surfaces S1, S2 so that no galvanic connection between the feeding networks 28 occurs.

In the region of the crossing sections 50, the grounding layer 54 is not present on the second surface S2.

Thus, a radiator feed 16 on a single substrate 24 is provided that is capable of feeding both dipoles 18 of the radiator 14 while, at the same time, providing mechanical support for the radiator 14.

Figure 7:
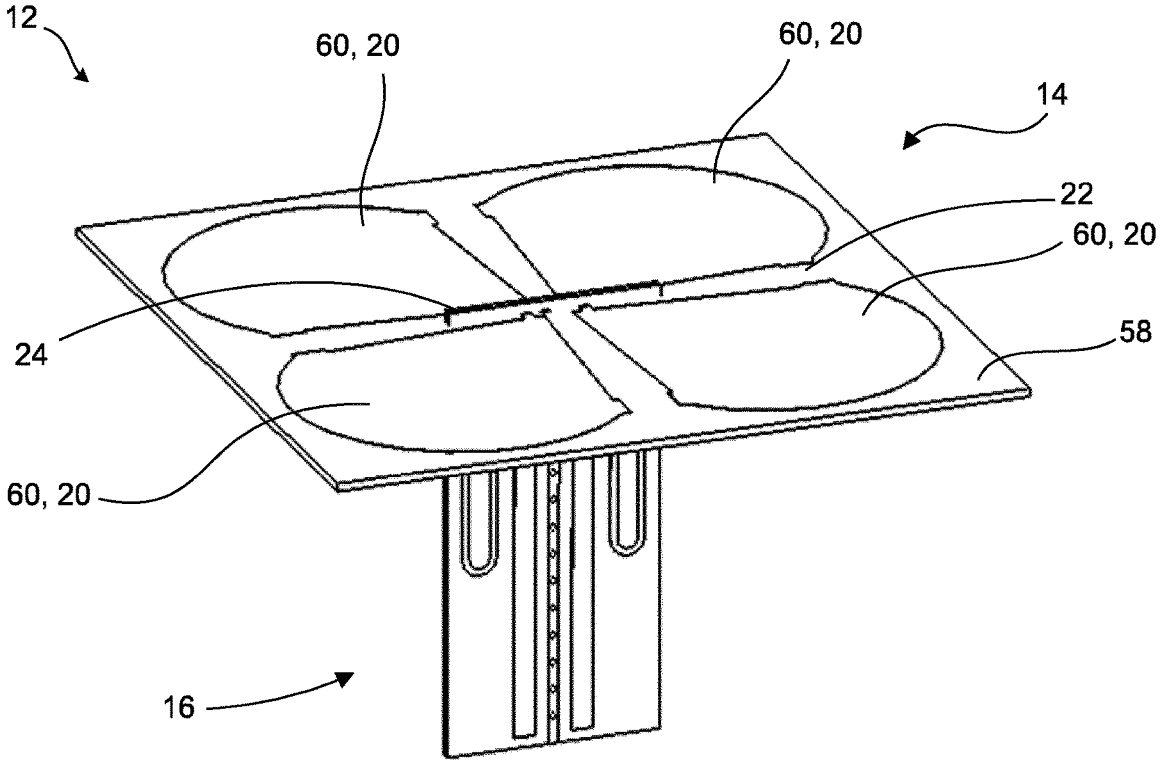

FIG. 7 shows a second embodiment of the radiator 14 which corresponds substantially to the radiator 14 of the first embodiment. In particular, the radiator feeds 16 are the same. Thus, only the differences are discussed in the following, wherein the same or functionally the same components are labeled with the same reference signs.

In the second embodiment, the radiator 14 also comprises a substrate 58, wherein metallizations 60 are applied to one of the surface, in particular the upper surface, of the substrate 58.

The substrate 58 is in particular a PCB.

The metallizations 60 form the four dipole arms 20 of the dipoles 18.

The substrate 58 extends in the dipole plane, thus perpendicular to the substrate 24 of the radiator feed 16.

The substrate 58 of the radiator 14 comprises a slot at the center C, wherein each of the dipole arms 20 extends from the slot outwards. The slot extends in the feed plane.

The radiator feed 16 extends through the slot so that the dipole arms 20 can be connected to the respective connection port 40 on the substrate 24 of the radiator feed 16.

Again, the substrate 24 of the radiator feed 16 provides the mechanical support for the substrate 58 of the radiator 14.

The invention claimed is:

1. Antenna, in particular for a mobile communication cell site, comprising at least one radiator and a radiator feed being electrically coupled to the at least one radiator, the at least one radiator being a dual polarized dipole radiator, wherein each dipole of the dual polarized dipole radiator is formed of two dipole arms and dipoles of the dual polarized dipole radiator are in a crossed arrangement relative to each other, wherein the radiator feed comprises a feed line for each dipole, a balun for each dipole and a connection port for each dipole arm of the at least one radiator, and wherein the radiator feed extends within a single feed plane between the dipole arms, the single feed plane intersecting the dipoles in a region of the crossing.

2. Antenna according to claim 1, characterized in that adjacent dipole arms are spaced apart by a gap, wherein the gap defines the feed plane.

3. Antenna according to claim 1, characterized in that the feed plane is 45° rotated with respect to a linear polarization plane of one of the dipoles and 135° rotated with respect to the linear polarization plane of the other one of the dipoles.

4. Antenna according to claim 1, characterized in that each one of the dipole arms is connected to one of the connection ports, in particular wherein the dipole arms of the same dipole are connected to connection ports which are connected to the same feed line.

5. Antenna according to claim 1, wherein the the dipole arms of each dipole extend in a same dipole plane, wherein the at least one radiator feed extends perpendicularly to said dipole plane.

6. Antenna according to claim 1, characterized in that the at least one radiator comprises a substrate, in particular a PCB, and metallizations applied to the substrate forming the dipole arms, and/or wherein the at least one radiator is made of a metal structure, in particular a metal sheet, forming the dipole arms.

7. Antenna according to claim 1, characterized in that the feed lines extend vertically from a respective input port of the radiator feed parallel to one another, in particular wherein laterally between the feed lines a grounded metallization section of the radiator feed is located.

8. Antenna according to claim 1, characterized in that the connection ports for the dipole arms of the same dipole lie on different sides of the radiator feed, in particular wherein the connection ports for dipole arms of different dipoles lie directly opposite to one another on the different sides.

9. Antenna according to claim 1, characterized in that the radiator feed comprises a T-section and a pair of branches for each dipole, wherein, for each dipole, the feed line extends from an input port to the T-section and each branch of the pair of branches extends from the T-section to a different one of the connection ports, in particular wherein one of the branches of each pair is a delay branch comprising a delay line.

10. Antenna according to claim 9, characterized in that the difference in length of the branches of the same pair is λ/2 or λ/4 of the wavelength of the center frequency of the design frequency range of the at least one radiator.

11. Antenna according to claim 1, characterized in that the radiator feed comprises a substrate having a first surface, a second surface and plurality of signal conductors applied to the surfaces, wherein the signal conductors form the feed line, a T-section, the pair of branches for each dipole and/or the connection ports, in particular wherein one branch of the branches of each pair of branches for each dipole extends partly on the first surface and partly on the second surface.

12. Antenna according to claim 11, characterized in that a crossing section of one branch of the branches of one of the pairs of branches crosses a crossing section of one of the branches of the other pair of branches, in particular the crossing sections extend on different surfaces of the substrate.

13. Antenna according to claim 12, characterized in that the substrate comprises vias, wherein the branches with the crossing sections comprise intermediate sections before and after the crossing sections, the intermediate sections of both branches are located on the same surface of the substrate and one of the crossing sections provided on the other surface and is connected to the intermediate sections by the vias.

14. Antenna according to claim 11, characterized in that at least one grounding layer is applied to the second surface of the substrate at least directly opposite of at least one of the feed lines, one of the branches and/or delay lines, wherein the grounding layer and the respective signal conductor form a microstrip transmission line.

15. Antenna according to claim 11, characterized in that the substrate of the radiator feed forms a support structure for the at least one radiator and/or wherein the radiator feed is formed as a single piece.

16. Cell site comprising an antenna, the antenna comprising at least one radiator and a radiator feed being electrically coupled to the at least one radiator, the at least one radiator being a dual polarized dipole radiator, wherein each dipole of the dual polarized dipole radiator is formed of two dipole arms and dipoles of the dual polarized dipole radiator are in a crossed arrangement relative to each other, wherein the radiator feed comprises a feed line for each dipole, a balun for each dipole and a connection port for each dipole arm of the at least one radiator, and wherein the radiator feed extends within a single feed plane between the dipole arms, the single feed plane intersecting the dipoles in a region of the crossing.

* * * * *